Aug. 8, 1944.  C. E. TACK ET AL  2,355,121
ROTOR BRAKE
Filed Dec. 12, 1941  3 Sheets-Sheet 1

INVENTORS:
Carl E. Tack
Wesley A. Helsten
BY
ATTORNEY

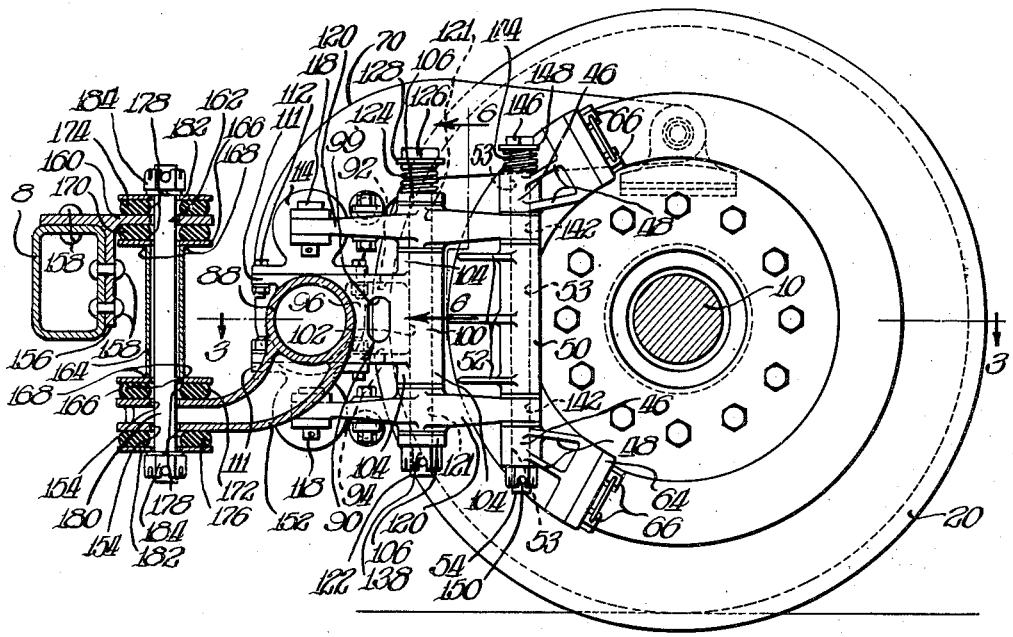

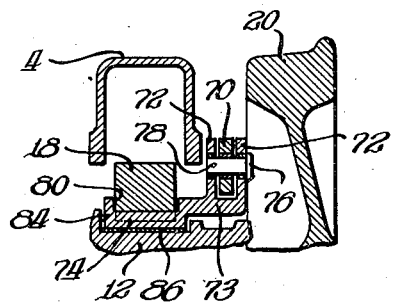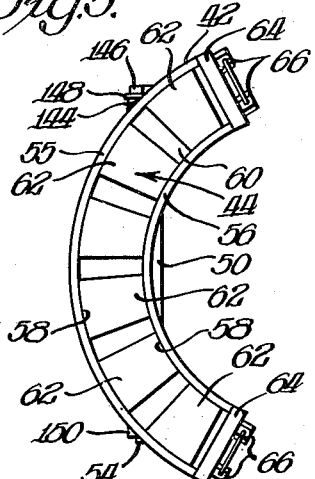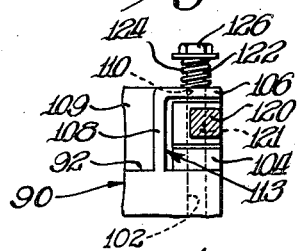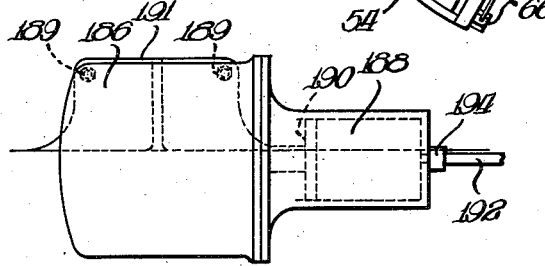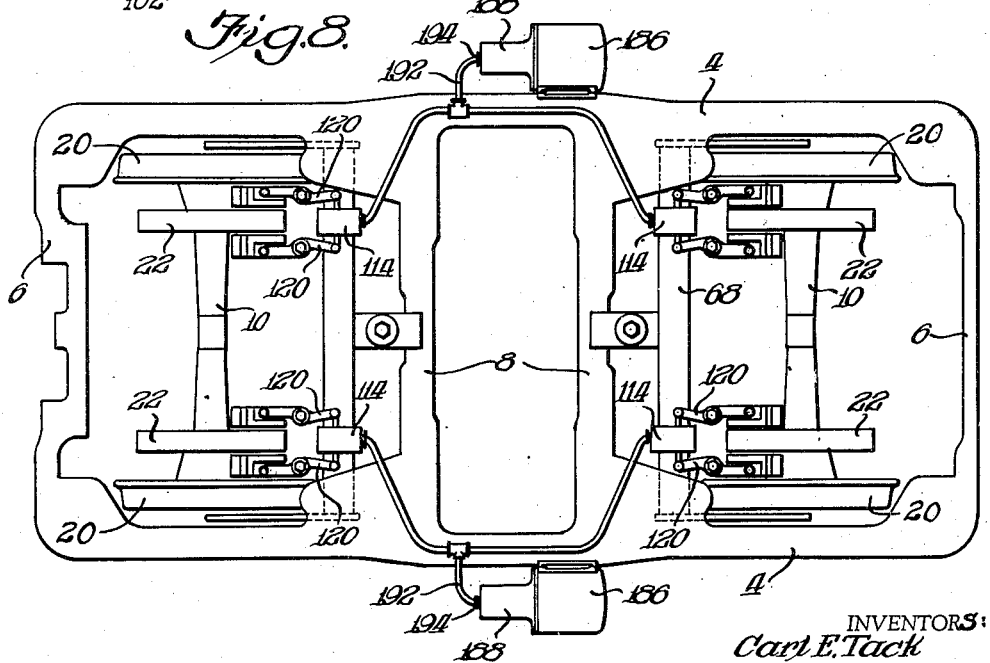

Patented Aug. 8, 1944

2,355,121

UNITED STATES PATENT OFFICE 2,355,121

ROTOR BRAKE

Carl E. Tack and Wesley A. Helsten, Chicago, Ill., assignors to American Steel Foundries, Chicago, Ill., a corporation of New Jersey Application December 12, 1941, Serial No. 422,632

22 Claims. (Cl. 188—59)

Our invention relates to braking devices for railway car trucks and more particularly to such a device wherein a brake disc is supported from each wheel of a supporting wheel and axle assembly and is squeezed between brake shoes supported at opposite sides thereof.

An object of our invention is to provide a support for said shoes which is non-concentric with respect to the associated wheel and axle assemblies, said support permitting the shoes to move with respect to the associated discs in a so-called "washing" action as particularly described in the co-pending application for Letters Patent Serial No. 421,418, filed December 3, 1941, in the name of Carl E. Tack, said "washing" action preventing the formation of concentric grooves in the shoes and in the associated discs.

Still another object of our invention is to design such a device as above described in which torque forces are transmitted to the journal boxes associated with said wheel and axle assemblies.

Our invention contemplates journal boxes provided with separable equalizer seats recessed in the tops thereof, said seats having inboard flanges formed and arranged for engagement with torque arms connected to the actuating means associated with our novel braking device.

A further object of our invention is to provide a resilient support from the associated truck frame for said actuating means, said support permitting movement of the brake rigging in coordination with movement of the associated wheel and axle assemblies.

Still another object of our invention is to provide in a braking device such as that above described, a novel brake disc of the type shown in co-pending application for Letters Patent Serial No. 409,999, filed September 8, 1941, in the name of Carl E. Tack, one of said discs being secured to each wheel of each wheel and axle assembly and comprising a plurality of parallel annular plates joined by radial webs spaced an equal distance from each other, said disc functioning as a rotary blower to draw air into the spaces between said plates, thus cooling said disc.

A further object of our invention is to provide actuating means for the braking devices associated with the wheel and axle assemblies of a railway car truck as described above, said actuating means comprising hydraulic cylinders with pistons therein having operative connections to brake levers engaged with the brake heads utilized in our novel arrangement and also comprising air cylinders and associated hydraulic master cylinders secured to the frame of said truck, said master cylinders transmitting power to said first-mentioned hydraulic cylinders.

In the drawings,

Figure 2 is a sectional view of the structure shown in Figure 1, the section being taken substantially in the vertical plane bisecting the truck longitudinally and as indicated by the line 2—2 of Figure 1.

Figure 3 is a fragmentary sectional view taken in the horizontal plane bisecting the wheel and axle assembly shown in Figure 2 and our novel brake device applied thereto as indicated by the line 3—3 of said figure.

Figure 4 is a fragmentary sectional view taken in the vertical plane indicated by the line 4—4 of Figure 1 and showing the novel arrangement of the torque arm and separable equalizer seat utilized in our device.

Figure 5 is a sectional view taken in the vertical plane indicated by the line 5—5 of Figure 1 and showing a brake head and the associated brake shoe utilized in our novel device.

Figure 6 is a fragmentary sectional view taken in the vertical plane indicated by the line 6—6 of Figure 2.

Figure 7 is a side elevation of one of the air cylinders and the associated hydraulic master cylinder utilized in our novel arrangement; and Figure 8 is a reduced plan view of a railway car truck embodying our invention and showing particularly the connections between the hydraulic cylinders and the master hydraulic cylinders.

Figure 1:
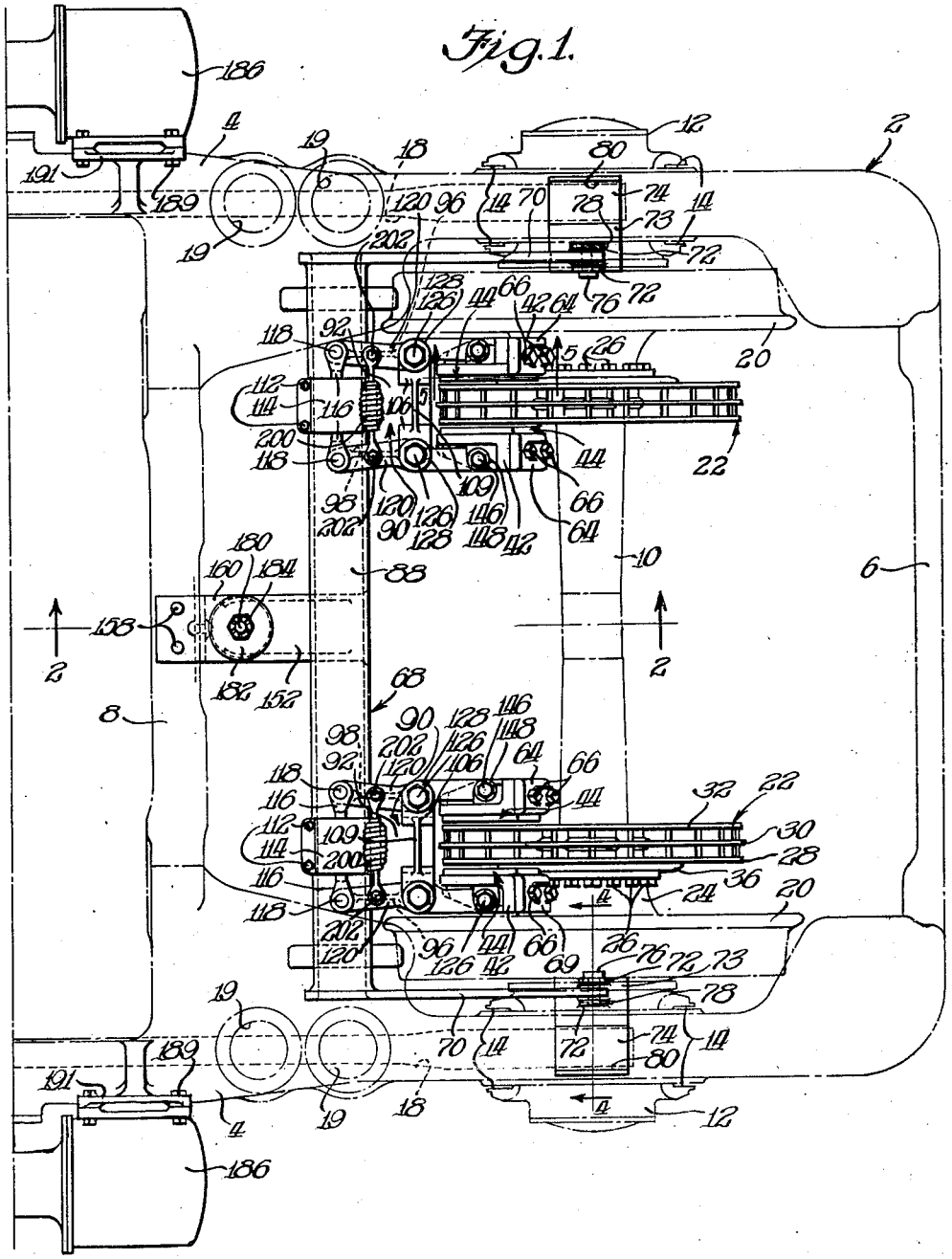
Figure 1 is a top plan view of a railway car truck embodying our novel braking arrangement, only one end of the truck being shown inasmuch as it is similar at opposite ends thereof.

Describing our novel brake arrangement in detail, the railway car truck generally indicated at 2 comprises the spaced side rails 4, 4, the end rails 6, 6, and the intermediate spaced transoms 8, 8 between which may be supported a bolster (not shown) in usual manner. The car truck is supported at each end thereof by a wheel and axle assembly including a rotating axle 10 having journal ends accommodated within outboard journal boxes 12, 12 in customary manner. Each journal box slidingly engages as at 14, 14 the spaced pedestal jaws formed at each end of the side rail 4. Engaged with said journal box in a manner hereinafter more fully described is an equalizer 18 affording a seat for the lower ends of coil springs 19, 19, and the upper ends of said springs may be seated in well known manner against the associated side rail 4.

Our novel braking means is disposed between the wheels 20, 20 which may be press-fitted on opposite ends of the axle 10 and includes spaced brake discs or rotors generally designated 22, 22 and of a form particularly shown in my above-mentioned application, each disc being supported by an inboard hub 24 formed on the adjacent wheel and secured thereto by the bolt and nut assemblies 26, 26. Each rotor 22, as may best be seen in Figure 3 and as more fully described in said last-mentioned co-pending application, is an integral casting comprising three spaced plates 28, 30, and 32 of annular form and arranged in parallel planes, the central plate 30 being substantially thickened as at 34 (Figure 3) in order to form a solid connection with the outer perimeter of the bell-like support portion 36 of said rotor, said portion being secured to the hub 24 of the associated wheel by the bolt and nut assemblies 26, 26 as heretofore described. Integrally joining the central plate 30 with the friction plates 28 and 32 on opposite sides thereof, are a series of equidistantly spaced radially arranged blades 38, 38, the blades between the plate 28 and the plate 30 being aligned with the blades between the plate 32 and the plate 30 in such a manner as to form columns between the plates 28 and 32 for resistance of pressure applied thereto by the associated brake mechanism. It may be noted that the relatively wide space between the plate portion of each wheel 20 and the adjacent friction plates 28 and 32 of the associated rotor affords a large air intake, so that cooling air may be drawn through the blades 38, 38 of the rotor at the inboard and outboard sides thereof substantially in the manner indicated by the curved arrows designated X and Y (Figure 3). It will be clearly apparent to those skilled in the art that the blades 38, 38 function as a rotary type of blower when the rotor is in normal operation and that peripheral force acts to throw outwardly the air between the blades and thus to draw air into the slots or openings 40, 40, as best seen in Figure 3, between adjacent blades, said air being drawn into the spaces at opposite sides of the rotor as heretofore described, and as more fully explained in my said last-mentioned co-pending application.

Arcuate brake heads 42, 42 are supported at opposite sides of each rotor 22 and secured to said heads are friction shoes generally designated 44, formed and arranged for frictional engagement with the friction plates 28 and 32. Each brake head, as best seen in Figure 2, comprises the spaced lugs 46, 46 adjacent opposite ends thereof and reinforced by the ribs 48, 48 and the intermediate lug 50 reinforced by the ribs 52, 52, said lugs having aligned openings 53, 53, therethrough for the reception of a securing pin 54 serving a purpose hereinafter fully described. Each brake head also comprises the arcuate flanges 55 and 56 serving as securing means for the brake shoe 44 as at 58, 58 and as best seen in the sectional view of Figure 5.

Each brake shoe 44, as best seen in Figure 5, is a composite member comprising a metallic backing plate 60 with composition braking material 62 secured thereon, said backing plate abutting as at 58, 58 the flanges 55 and 56 on the brake head to secure said shoe with respect thereto in the manner above described. It may be noted that each backing plate 60 is seated upon a resilient pad 63 (Figure 3) interposed between said plate and the associated brake head. A cap 64 is secured to each end of each brake head 38 by means of the cap screws 66, 66 and serves to secure the associated brake shoe with respect to said head.

A brake frame generally designated 68 (Figure 1) supports the actuating means for said shoes and comprises the end torque arms 70, 70, each of said arms being of rectangular section as best seen in the sectional view of Figure 4, and the end of each torque arm 70 is received between spaced inboard and outboard vertical lugs 72, 72 formed on the horizontal flange 73 on the associated equalizer seat 74 and is secured by the pin 76 keyed as at 78. The equalizer seat also comprises a recess 80 within which the end of the associated equalizer 18 may be positioned, said equalizer seat 74 being recessed as at 84 in the top of the associated journal box 12 and seated upon a pad 86 of linoleum or other similar material.

The brake frame 68 also comprises the torque tube 88 connecting said torque arms 70, 70 and integrally formed therewith. Adjacent each wheel 20, the torque tube is formed with a brake lever supporting member generally designated 90, said member being of generally rectangular form and comprising top and bottom webs 92 and 94 and inboard and outboard vertical webs 96 and 98 each being cored away as at 99, 99 (Figure 2). Integrally formed with each of the side webs 96 and 98 and extending between the top and bottom webs 92 and 94 is an annular lug 100 with an opening 102 therethrough. Each lug 100 is extended upwardly from said top web 92 and downwardly from said bottom web 94 to form bosses 104, 104 on the top and bottom of each brake lever supporting member 90, and the opening 102 through said lug is continuous through said bosses. Overlying each boss 104 is a horizontal flange 106 (Figure 6) supported by the vertical flange 108 formed on the associated top or bottom wall 92 or 94, and said flanges 106, 106 comprise openings 110, 110 therethrough aligned with said openings 102, 102. The flanges 108, 108 are reinforced by the vertical webs 109, 109 extending therebetween. It may be noted that the flanges 106, 106 and 108, 108 and the bosses 104, 104 define jaws generally designated 113, 113 (Figure 6) at the corners of the brake lever supporting member 90 adjacent the associated rotor 22, said jaws serving a purpose hereinafter described.

Secured by the spaced bolt and nut assemblies 112, 112 to the top and bottom webs 92 and 94 of each brake lever supporting member 90 and to the horizontal flanges 111, 111 (Figure 2) formed on the top and bottom of the associated torque tube 88 is the hydraulic cylinder 114 with the oppositely directed pistons 116, 116 therein, each of said pistons being pivotally connected as at 118 with an end of the associated brake lever 120, said lever being received and fulcrumed intermediate its ends within the associated jaw 113 on the support member 90, as best seen in the sectional view of Figure 6, and secured therewithin by the pin 122 in a manner hereinafter more fully described. Seated on each horizontal flange 106 formed on the top wall 92 of each brake lever supporting member 90 is a coiled friction spring 124 and the associated pin 122 extends through the spring 124, through the opening 110 in said flange, through the opening 102 in the associated bosses 104, 104, and the associated annular lug 100, and through the openings 121, 121 intermediate the ends of the associated brake levers 120, 120, thus fulcruming said levers respectively from the top and bottom of the supporting member 90. The pin 122 is positioned at the top thereof by a head 126 integrally formed thereon and a washer 128 positioned between said head and said friction spring 124. A nut 138 is threaded on the lower end of said pin and is tightened to place the spring 124 under compression. The opposite ends of the levers 120, 120 at each side of the support member 90 are received between the end lugs 46, 46 and the intermediate lug 50 on the associated brake head and are secured by the pin 54 extending through the aligned openings 53, 53 in said lugs, through the openings 142, 142 in the ends of said levers and through a compression spring 144 seated on the top end lug 46, said pin being positioned at the top thereof by the head 146 thereon and by the washer 148 positioned between said head and said spring 144. A nut 150 is threaded on the lower end of said pin and tightened to place the spring 144 under compression.

Integrally formed with each torque tube 88 and centrally thereof is an arm 152 with an opening 154 therethrough. A bracket 156 is secured to the associated transom 8 of the truck frame by rivets or other convenient means as at 158, 158, said bracket comprising a top web 160 with an opening 162 therethrough. The web 160 and the arm 152 are resiliently connected to each other, said connection comprising a hollow tube 164 with plates 166, 166 welded to the ends thereof as at 168, 168. A rubber-like pad 170 is positioned between the web 160 and the associated plate 166, and an identical pad 172 is positioned between the arm 152 and the associated plate 166. Rubber-like pads 174 and 176, identical with the above-mentioned pads, are positioned respectively atop the web 160 and abutting the bottom of the arm 152. All of said pads have openings 178, 178 therethrough, said opening being aligned with each other and with the opening 154 in the arm 152 and the opening 162 in the web 160 of the bracket 156. A rod 180 extends through said openings 154 and 162 and 178, 178 and is secured at the ends thereof by the washers 182, 182 and the nuts 184, 184, said nuts being tightened to place said rubber-like pads under compression.

Air cylinders 186, 186 and associated master hydraulic cylinders 188, 188 (Figures 7 and 8) may be secured as at 189, 189 to the cylinder pads 191, 191 formed on the side rails 4, 4, the piston 190 in each air cylinder transmitting force by means of the fluid in the master hydraulic cylinder through the supply pipe 192 connected thereto as at 194 to the hydraulic cylinders 114, 114 which actuate the levers 120, 120 associated with the rotors 22, 22. In operation, the cylinder pistons 116, 116 associated with each cylinder 114 will force the ends of the brake levers connected to said pistons apart from each other, and the opposite ends of said levers will be moved inwardly toward each other and will cause the rotor 22 to be squeezed between the brake shoes 44, 44 at opposite sides thereof. Torque will be transmitted to the journal boxes 12, 12 through the arms 70, 70 and to the side frame 2 through the arm 152 as heretofore described. Upon release of the power means, the levers 120, 120 associated with each clyinder will be forced inwardly toward each other at the ends connected to the pistons 116, 116 by means of the release spring 200 connected at each end thereof to said levers as at 202, 202, and thus said levers will be forced outwardly away from each other at the ends adjacent the associated rotor 22, so that the associated friction shoes 44, 44 will be released from engagement therewith.

Thus it will be seen that torque forces are transmitted to the frame 2 through the arms 152, 152 and to the journal boxes through the torque arms 70, 70. It will be further understood that the connection of the arms 70, 70 to the equalizer seats 74, 74 will cause the brake rigging to move in coordination with movements of the associated wheel and axle assemblies. This movement of the rigging will be resiliently controlled by the resilient connection of the arms 152, 152 to the truck frame.

It will also be seen that we have designed a novel brake arrangement in which brake shoes associated with brake discs supported from the wheels of wheel and axle assemblies supporting a railway car truck are supported non-concentrically with respect to said wheel and axle assemblies, said support comprising torque arms engaged with separable equalizer seats recessed in the top of the journal boxes associated with said wheel and axle assemblies in such manner as to permit the removal of said assemblies without disturbing the associated brake rigging.

And it will be further seen that the above-described non-concentric support for said shoes will permit their relative motion with respect to the associated discs in such a manner as to prevent the formation of concentric grooves in said shoes and said discs, said motion being characterized as a "washing" motion and more fully described in said first-mentioned co-pending application.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In a brake arrangement, a wheel and axle assembly including an axle and a member rotatable therewith, friction shoes supported for engagement with opposite sides of said member, a plurality of spaced levers associated with each shoe, fulcrum means supported adjacent said assembly for said levers, and double acting power cylinders associated with said levers for actuation thereof, each of said cylinders being operatively connected to one lever associated with each shoe.

2. In a brake arrangement for a railway car truck, a frame member, spaced supporting wheel and axle assemblies each comprising an axle having journaled ends and wheels fitted on said axle, journal boxes associated with said ends, brake discs secured to said wheels, brake shoes formed and arranged for frictional engagement with respective discs, equalizer seats mounted atop said journal boxes, equalizers mounted on the seats at opposite sides of the truck, resilient means seated on said equalizers and supporting said frame member, actuating and support means associated with said shoes, and a support for said actuating and support means comprising means pivotally engaged with the associated equalizer seats and resiliently connected to said frame member.

3. In a brake arrangement for a railway car truck, a frame member, spaced supporting wheel and axle assemblies each comprising an axle having journal ends and wheels fitted on said axle, journal boxes associated with said ends, brake discs secured to said wheels, positioning means pivotally supported from respective journal boxes eccentrically with respect to the associated assembly and resiliently supported from said frame member, power means mounted on said first-mentioned means, brake shoes positioned at opposite sides of each disc, and brake levers associated with each disc and connected at corresponding ends thereof to respective shoes, at the opposite corresponding ends thereof to the associated power means, and intermediate the ends thereof to said first-mentioned means.

4. In a brake arrangement for a railway car truck, a frame member, spaced supporting wheel and axle assemblies each comprising an axle having journal ends and wheels fitted on said axle, journal boxes associated with said ends, brake discs secured to said wheels, brake shoes supported at opposite sides of said discs, brake frames comprising transverse members, torque arms formed at the ends of said transverse members and pivotally engaged with said journal boxes above the axes of the associated assemblies, and actuating means mounted on said transverse members and associated with said shoes.

5. In a brake arrangement for a railway car truck, a frame member, spaced supporting wheel and axle assemblies each comprising an axle having journal ends and wheels fitted on said axle, journal boxes associated with said ends, brake discs secured to said wheels, brake shoes supported at opposite sides of said discs, equalizer seats mounted on said journal boxes, equalizers seated thereon at opposite sides of the truck, resilient means mounted on said equalizers and supporting said frame member, actuating means associated with said shoes, and a support for said actuating means comprising means pivotally engaged with the associated equalizer seats above the axes of the associated assemblies, and a resilient connection to said frame member.

6. In a brake arrangement for a railway car truck comprising a truck frame and a supporting wheel and axle assembly including an axle and a member rotatable therewith, a brake support member extending transversely of the truck and being afforded support therefrom adjacent the ends of said assembly, friction shoes for engagement with opposite sides of said rotatable member, brake levers fulcrumed from said support member and engaged with respective shoes, and cylinders supported from said support member thereabove and therebelow for actuation of respective levers.

7. In a brake arrangement for a railway car truck, a frame member, spaced supporting wheel and axle assemblies each comprising an axle having journal ends and wheels fitted on said axle, journal boxes associated with said ends, brake discs secured to said wheels, brake shoes supported at opposite sides of said discs, equalizer seats mounted on said journal boxes, equalizers seated thereon at opposite sides of the truck, resilient means seated on said equalizers and supporting said frame member, actuating means associated with said shoes, and a support for said actuating means comprising means pivotally engaged with said equalizer seats above the axes of the associated assemblies.

8. In a brake arrangement for a railway car truck, a frame member, spaced supporting wheel and axle assemblies each comprising an axle having journal ends and wheels fitted on said axle, journal boxes associated with said ends, brake discs secured to said wheels, brake shoes formed and arranged for frictional engagement with said discs, equalizer seats removably mounted on said journal boxes, equalizers seated thereon at opposite sides of the truck and affording a resilient support for said frame member, actuating means associated with respective shoes, and a nonconcentric support with respect to the associated assemblies for said actuating means comprising means pivotally engaged with said seats.

9. In a brake arrangement for a railway car truck comprising a truck frame and a supporting wheel and axle assembly including an axle and a member rotatable therewith, a brake support member extending transversely of the truck and supported therefrom adjacent said assembly, friction shoes for engagement with opposite sides of said rotatable member, a pair of brake levers connected to each shoe and fulcrumed respectively from said support member thereabove and therebelow, and actuating means for said levers.

10. In a brake arrangement for a railway car truck, a frame member, spaced supporting wheel and axle assemblies each comprising an axle having journal ends and wheels fitted on said axle, journal boxes associated with said ends, brake discs secured to said wheels, brake shoes formed and arranged for frictional engagement with said discs, brake frames comprising transverse members, torque arms formed at the ends of said transverse members and pivotally engaged with said journal boxes eccentrically with respect to the associated assemblies, and actuating means mounted on said transverse members and associated with said shoes.

11. In a brake arrangement for a railway car truck, a frame member, spaced supporting wheel and axle assemblies each comprising an axle having journal ends, and wheels fitted on said axle, journal boxes associated with said ends, brake discs secured to said wheels, brake shoes supported at opposite sides of said discs, brake frames comprising transverse members, torque arms formed at the ends of said transverse members and pivotally engaged with said journal boxes above the axes of the associated assemblies, and actuating means mounted on said transverse members and associated with said shoes.

12. In a brake arrangement for a railway car truck comprising a truck frame and a supporting wheel and axle assembly including an axle and a member rotatable therewith, a brake support member extending transversely of the truck and supported therefrom adjacent said assembly, friction shoes for engagement with opposite sides of said rotatable member, brake levers connected to each shoe and fulcrumed respectively from said support member thereabove and therebelow, and actuating means comprising double-acting cylinders supported above and below said support member, each cylinder being operatively connected to corresponding levers associated with respective shoes.

13. In a brake arrangement, a frame member, a supporting wheel and axle assembly comprising an axle having a journal end and a wheel fitted on said axle, a journal box associated with said end, a brake disc secured to said wheel, brake shoes formed and arranged for frictional engagement with said disc, and operating means associated with said shoes, nonconcentrically and pivotally supported with respect to said assembly from said box, and resiliently supported from said frame member.

14. In a brake arrangement, a wheel and axle assembly comprising an axle having a journal end and a wheel on said axle, a journal box associated with said end, a brake disc secured to said wheel, brake shoes supported at opposite sides of said discs, and operating means associated with said shoes and pivotally supported from said box eccentrically with respect to said assembly.

15. In a brake arrangement, a vehicle frame, a supporting wheel and axle assembly, journal boxes associated therewith, a rotor driven by said assembly, a brake frame pivotally mounted on said boxes nonconcentrically with respect to said assembly, said brake frame being resiliently supported from said vehicle frame, brake shoes supported from said brake frame for engagement with the sides of said rotor, and actuating means for said shoes, the support of said brake frame being adapted to afford a washing action for said shoes against said rotor during braking engagement therewith.

16. In a brake arrangement, a vehicle frame, a supporting wheel and axle assembly, journal means associated therewith, a rotor driven by said assembly, friction means for engagement with the sides of said rotor, actuating means for said friction means, rigid support means for said friction means, said support means being movably mounted on said journal means nonconcentrically with respect to said assembly, and a flexible torque connection between said frame and said support means, said torque connection comprising a substantially vertical rod resiliently connected at opposite ends thereof to said vehicle frame and to said support means.

17. In a brake arrangement for a railway car truck comprising a truck frame and a supporting wheel and axle assembly including an axle and a member rotatable therewith, friction means for engagement with inboard and outboard surfaces on said member, and a member extending transversely of the truck and affording support for said friction means, said last-mentioned member being afforded support from said truck adjacent the ends of said assembly, and a substantially vertical torque rod resiliently connected to said last-mentioned member intermediate its ends, said rod being resiliently connected to said frame.

18. In a brake arrangement, a wheel and axle assembly, a rotor driven thereby, friction shoes supported for engagement with opposite sides of said rotor, a plurality of spaced levers associated with each shoe, fulcrum means supported from said assembly for said levers, and double acting power cylinders supported from said fulcrum means and each being operatively connected to one lever associated with each shoe.

19. In a brake arrangement, a vehicle frame, a supporting wheel and axle assembly, a rotor driven by said assembly, a brake frame comprising a transverse member resiliently connected to the vehicle frame and longitudinal members supported adjacent respective ends of said assembly, friction shoes for engagement with opposite sides of said rotor, brake levers fulcrumed from said brake frame and engaged with respective shoes, and cylinders supported above and below said transverse member for actuation of respective levers.

20. In a brake arrangement, a vehicle frame, a supporting wheel and axle assembly, a rotor driven by said assembly, a brake frame comprising a transverse member resiliently connected to the vehicle frame and longitudinal members supported adjacent respective ends of said assembly, friction shoes for engagement with opposite sides of said rotor, brake levers fulcrumed from said brake frame above and below said transverse member and operatively connected to each shoe, and actuating means for said levers.

21. In a brake arrangement, a vehicle frame, a supporting wheel and axle assembly, a rotor driven by said assembly, a brake frame comprising a transverse member resiliently connected to the vehicle frame and longitudinal members supported adjacent respective ends of said assembly, friction shoes for engagement with opposite sides of said rotor, brake levers fulcrumed from said brake frame above and below said transverse member and operatively connected to each shoe, and actuating means for said levers, said actuating means comprising double acting cylinders supported above and below said transverse member, each cylinder being operatively connected to corresponding levers associated with respective shoes.

22. In a brake arrangement, a wheel and axle assembly including an axle and a member rotatable therewith, journal means associated with said assembly, rigid means pivotally supported from said journal means eccentrically with respect to said assembly, and friction means supported from said rigid means for engagement with inboard and outboard sides of said member.

CARL E. TACK.
WESLEY A. HELSTEN.